US009913290B2

(12) United States Patent
Guo

(10) Patent No.: US 9,913,290 B2
(45) Date of Patent: Mar. 6, 2018

(54) METHOD AND APPARATUS FOR HANDLING UPLINK TRANSMISSION IN A WIRELESS COMMUNICATION SYSTEM

(71) Applicant: ASUSTeK Computer Inc., Taipei (TW)

(72) Inventor: Yu-Hsuan Guo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 153 days.

(21) Appl. No.: 14/990,365

(22) Filed: Jan. 7, 2016

(65) Prior Publication Data

US 2016/0219619 A1    Jul. 28, 2016

Related U.S. Application Data

(60) Provisional application No. 62/107,834, filed on Jan. 26, 2015, provisional application No. 62/183,439, filed on Jun. 23, 2015.

(51) Int. Cl.
  *H04W 72/14* (2009.01)
  *H04W 72/12* (2009.01)
  *H04L 5/00* (2006.01)

(52) U.S. Cl.
  CPC .......... *H04W 72/14* (2013.01); *H04L 5/0035* (2013.01); *H04W 72/1231* (2013.01); *H04W 72/1289* (2013.01); *H04L 5/0048* (2013.01); *H04L 5/0096* (2013.01)

(58) Field of Classification Search
  CPC ............. H04W 72/14; H04W 72/1289; H04W 72/1231; H04L 5/0035; H04L 5/0048; H04L 5/0096
  See application file for complete search history.

(56) References Cited

U.S. PATENT DOCUMENTS

| 2012/0113967 A1 | 5/2012 | Smith et al. |
| 2012/0170497 A1 | 7/2012 | Zhang et al. |
| 2013/0208702 A1 | 8/2013 | Sandberg |

(Continued)

FOREIGN PATENT DOCUMENTS

| EP | 2782405 | 9/2014 |
| KR | 20140123446 | 10/2014 |

(Continued)

OTHER PUBLICATIONS

Notice of Non-Final Rejection received from the Korean Intellectual Property Office in the corresponding Korean Patent Application No. 10-2016-0001927, dated Jul. 13, 2016.

(Continued)

*Primary Examiner* — Ian N Moore
*Assistant Examiner* — Brian T Le
(74) *Attorney, Agent, or Firm* — Blue Capital Law Firm, P.C.

(57) ABSTRACT

Methods and apparatuses are disclosed for handling uplink transmission in a wireless communication system. In one method, a user equipment (UE) connects to at least two base stations including a first base station controlling a first serving cell and a second base station controlling a second serving cell. The method further includes the UE receiving a downlink signaling in the second serving cell. The method also includes the UE transmitting a reference signal in the first serving cell in response to the reception of the downlink signaling.

20 Claims, 11 Drawing Sheets

(56) References Cited

U.S. PATENT DOCUMENTS

| | | | |
|---|---|---|---|
| 2014/0064122 A1* | 3/2014 | Chin | H04W 36/14 370/252 |
| 2014/0192740 A1 | 7/2014 | Ekpenyong et al. | |
| 2014/0335882 A1* | 11/2014 | Lee | H04W 76/025 455/452.2 |
| 2015/0319703 A1 | 11/2015 | Kwon et al. | |
| 2015/0351119 A1* | 12/2015 | Song | H04W 72/1268 370/329 |

FOREIGN PATENT DOCUMENTS

| KR | 10-2014-0133463 | 11/2014 |
|---|---|---|
| KR | 20150005458 | 1/2015 |
| WO | 2014/109685 | 7/2014 |
| WO | 2014172306 | 10/2014 |

OTHER PUBLICATIONS

Office Action from corresponding TW Patent Application No. 105101814, dated Feb. 23, 2017.
Search Report from corresponding TW Patent Application No. 105101814, dated Feb. 23, 2017.
European search report from the corresponding European Application No. 16152596.9, dated Jun. 30, 2016.
Alcatel-Lucent, Alcatel-Lucent Shanghai Bell, Power saving with fast release of CSI/SRS [online], 3GPP TSG RAN WG2 Meeting #79bis R2-124880, Sep. 28, 2012, [retrieved on Mar. 14, 2017], Retrieved from the Internet: <URL:http://www.3gpp.org/ftp/tsg_ran/WG2_RL2/TSGR2_79bis/Docs/R2-124880.zip>.
Office Action from corresponding JP Application No. 2016-001796, dated Mar. 28, 2017.
Notice of Allowance of Patent from the Korean Intellectual Property Office in the corresponding Korean Patent Application No. 10-2016-0001927, dated Jan. 26, 2017.

* cited by examiner

METHOD AND APPARATUS FOR HANDLING UPLINK TRANSMISSION IN A WIRELESS COMMUNICATION SYSTEM

CROSS-REFERENCE TO RELATED APPLICATIONS

The present Application claims the benefit of U.S. Provisional Patent Application Ser. No. 62/107,834 filed on Jan. 26, 2015 and U.S. Provisional Patent Application Ser. No. 62/183,439 filed on Jun. 23, 2015, the entire disclosures of which are incorporated herein by reference.

FIELD

This disclosure generally relates to wireless communication networks, and more particularly, to a method and apparatus for handling uplink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

Methods and apparatuses are disclosed for handling uplink transmission in a wireless communication system. In one method, a user equipment (UE) connects to at least two base stations including a first base station controlling a first serving cell and a second base station controlling a second serving cell. The method further includes the UE receiving a downlink signaling in the second serving cell. The method also includes the UE transmitting a reference signal in the first serving cell in response to the reception of the downlink signaling.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to the wireless technology discussed in various documents of the DOCOMO 5G White Paper, NTT DoCoMo (July 2014). Furthermore, the exemplary wireless communication systems devices described below may be designed to support one or more standards such as the standard offered by a consortium named "3rd Generation Partnership Project" referred to herein as 3GPP, including: 3GPP R2-145410, "Introduction of Dual Connectivity"; 3GPP TS 36.321 V12.3.0, "E-UTRA MAC protocol specification"; 3GPP TS 36.331 V12.3.0, "E-UTRA RRC protocol specification"; 3GPP TS 36.300 V12.3.0, "E-UTRA and E-UTRAN Overall description". The standards and documents listed above are hereby expressly incorporated by reference in their entirety.

Figure 1:
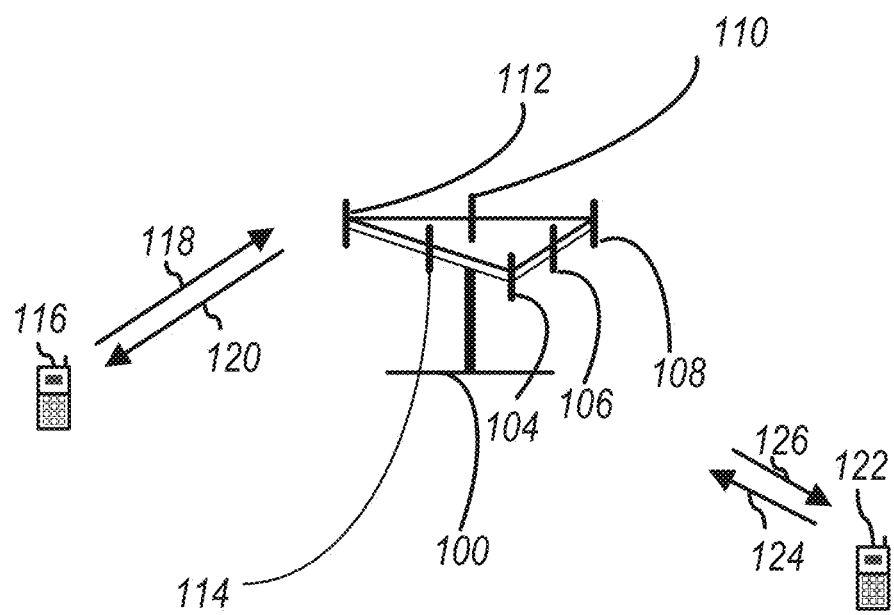
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. An access terminal 116 (AT) is in communication with antennas 112 and 114, where antennas 112 and 114 transmit information to the access terminal 116 over forward link 120 and receive information from the access terminal 116 over reverse link 118. An access terminal (AT) 122 is in communication with antennas 106 and 108, where antennas 106 and 108 transmit information to the access terminal (AT) 122 over forward link 126 and receive information from the access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
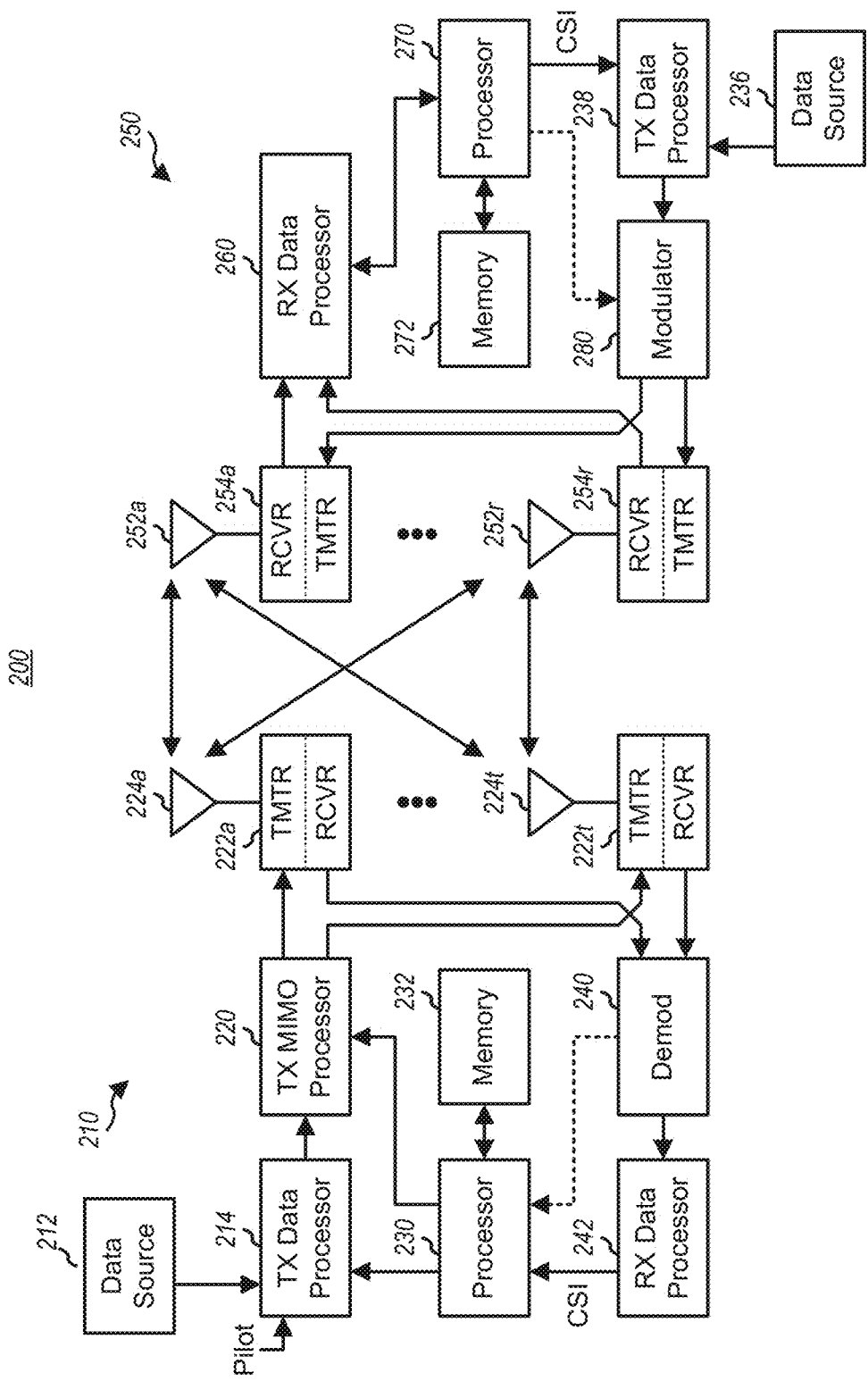
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
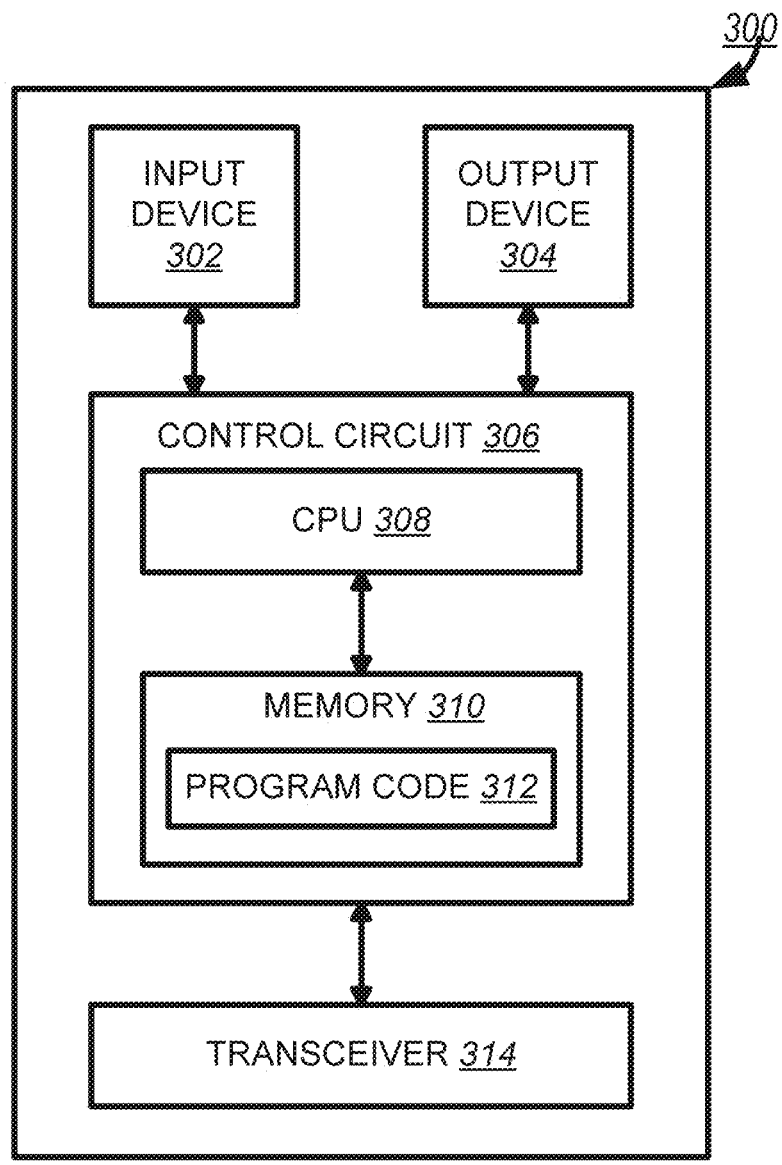
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
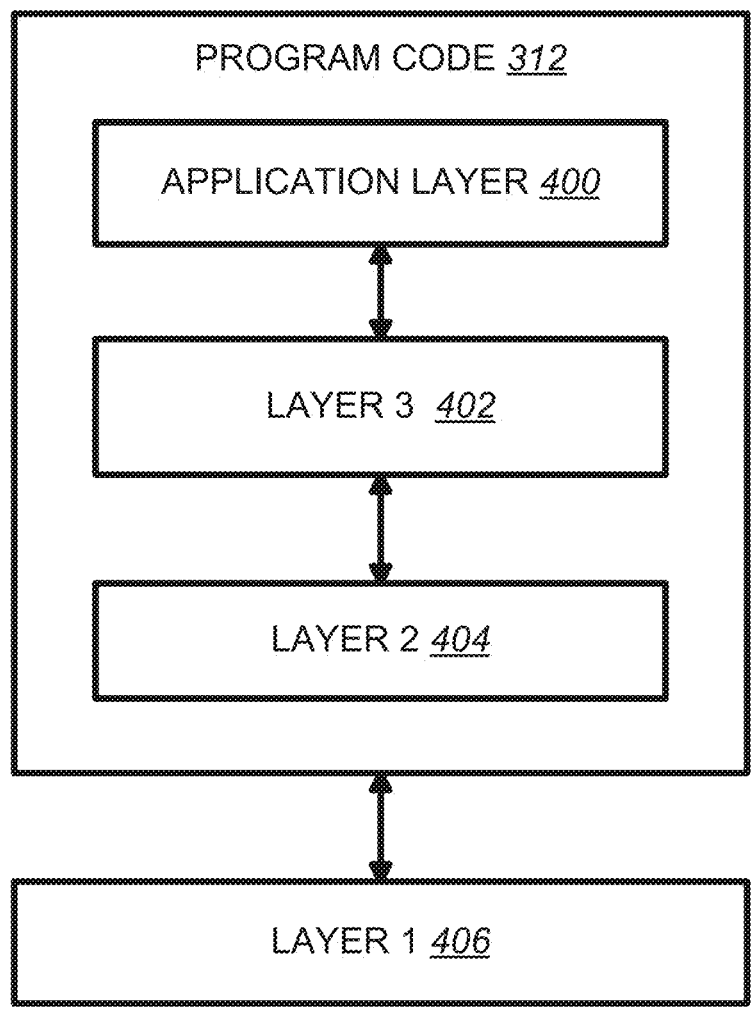
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion 404 may include a Radio Link Control (RLC) layer and a Medium Access Control (MAC) layer. The Layer 3 portion 402 may include a Radio Resource Control (RRC) layer.

The concept of radio access for 5G is mentioned in the DOCOMO 5G White Paper. One key point also mentioned in this paper is to efficiently integrate both lower and higher frequency bands. Higher frequency bands provide opportunities for wider spectrum, but they have coverage limitations because of higher path loss. So, in the DOCOMO 5G White Paper, it is proposed that a 5G system have a two-layer structure that consists of a coverage layer (e.g. consisting of macro cell(s)) and a capacity layer (e.g. consisting of small cell(s) or phantom cell(s)). The coverage layer use existing lower frequency bands to provide basic coverage and mobility. And the capacity layer uses new higher frequency bands to provide high data rate transmission. The coverage layer could be supported by enhanced Long Term Evolution Radio Access Technology (LTE RAT) while the capacity layer could be supported by a new RAT dedicated to higher frequency bands. The efficient integration of the coverage and capacity layers is enabled by the tight interworking (dual connectivity) between the enhanced LTE RAT and the new RAT.

Dual connectivity as disclosed in 3GPP R2-145410 is a mode of operation of a user equipment (UE) in RRC_CONNECTED, configured with a Master Cell Group (i.e., a group of serving cells associated with the Master eNB (MeNB), including the Primary Cell (PCell) and optionally one or more Secondary Cells (SCells)) and a Secondary Cell Group (i.e., a group of serving cells associated with the Secondary eNB (SeNB), including a Primary SCell (PSCell) and optionally one or more SCells). A UE configured with dual connectivity means that the UE is configured to utilize radio resources provided by two distinct schedulers, located in two eNBs (e.g., MeNB and SeNB) connected via a non-ideal backhaul over the X2 interface. Other details of dual connectivity are disclosed in 3GPP R2-145410.

In order to maintain uplink time alignment in a serving cell or a serving cell group. Timing Advance Command (in a MAC control element or a Random Access Response message) and timeAlignmentTimer are used in LTE as disclosed in 3GPP TS 36.321 V12.3.0 as follows:

5.2 Maintenance of Uplink Time Alignment

The UE has a configurable timer timeAlignmentTimer per TAG. The timeAlignmentTimer is used to control how long the UE considers the Serving Cells belonging to the associated TAG to be uplink time aligned [8].

The UE shall:
when a Timing Advance Command MAC control element is received:
  apply the Timing Advance Command for the indicated TAG;
  start or restart the timeAlignmentTimer associated with the indicated TAG.
when a Timing Advance Command is received in a Random Access Response message for a serving cell belonging to a TAG:
  if the Random Access Preamble was not selected by UE MAC:
    apply the Timing Advance Command for this TAG;
    start or restart the timeAlignmentTimer associated with this TAG.
  else, if the timeAlignmentTimer associated with this TAG is not running:
    apply the Timing Advance Command for this TAG;
    start the timeAlignmentTimer associated with this TAG;
    when the contention resolution is considered not successful as described in subclause 5.1.5, stop timeAlignmentTimer associated with this TAG.
  else:
    ignore the received Timing Advance Command.
when a timeAlignmentTimer expires:
  if the timneAlignment Timer is associated with the pTAG:
    flush all HARQ buffers for all serving cells;
    notify RRC to release PUCCH/SRS for all serving cells;
    clear any configured downlink assignments and uplink grants;
    consider all running timeAlignmentTimers as expired;
  else if the timeAlignmentTimer is associated with an sTAG, then for all Serving Cells belonging to this TAG:
    flush all HARQ buffers:
    notify RRC to release SRS.

The UE shall not perform any uplink transmission on a Serving Cell except the Random Access Preamble transmission when the timeAlignmentTimer associated with the TAG to which this Serving Cell belongs is not running. Furthermore, when the timeAlignmentTimer associated with the pTAG is not running, the UE shall not perform any uplink transmission on any Serving Cell except the Random Access Preamble transmission on the PCell.

NOTE: A UE stores or maintains $N_{TA}$ upon expiry of associated tinmeAlignmentTimer, where $N_{TA}$ is defined in [7]. The UE applies a received Timing Advance Command MAC control element and starts associated timeAlignmentTimer also when the timeAlignmentTimer is not running.

Also, the cells on the capacity layer may use beam forming. Beam forming is a signal processing technique used in antenna arrays for directional signal transmission or reception. This is achieved by combining elements in a phased array in such a way that signals at particular angles experience constructive interference while others experience destructive interference. Beam forming can be used at both the transmitting and receiving ends in order to achieve spatial selectivity. The improvement compared with omni-directional reception/transmission is known as the receive/transmit gain.

Beam forming has been applied in radar systems. The beam created by a phased array radar is comparatively narrow and highly agile compared to a moving dish. This characteristic gives the radar the ability to detect small, fast targets like ballistic missiles in addition to aircrafts.

The benefit of co-channel interference reduction also makes beam forming attractive option in a mobile communication system. For example, the concept of beam division multiple access (BDMA) based on beam forming technique has been utilized. In BDMA, a base station can communicate with a mobile device via a narrow beam to obtain the receive/transmit gain. Besides, two mobile devices in different beams can share the same radio resources at the same time and thus the capacity of a mobile communication system can increase greatly. To achieve this, the base station would need to know in which beam a mobile device is located.

As previously disclosed, it is assumed that a cell using a higher frequency band would have coverage limitation and should be a small cell. As a result, the mechanism to maintain uplink time alignment, e.g. Timing Advance Command and timeAlignmentTimer, may not be necessary assuming that a UE in the small cell is always uplink time aligned due to small coverage of the small cell. In other words, the UE does not need to maintain a timer associated with the small cell to decide whether uplink time is or is not aligned. Alternatively, the value of the timer can be set to infinity.

However, if the timeAlignmentTimer is not used, the UE would not stop any uplink transmission on the cell due to time expiration, (e.g. by flushing all Hybrid Automatic Repeat Request (HARQ) buffers for associated serving cell(s) and notifying Radio Resource Control (RRC) to release Physical Uplink Control Channel (PUCCH) and/or Sounding Reference Signal (SRS) for associated serving cell(s)). If there is no Uplink (UL) or Downlink (DL) traffic associated with the UE, the constant transmission of a uplink transmission (e.g., periodic SRS and periodic Channel Quality Indicator (CQI)), would result in unnecessary UE power consumption. Accordingly, stopping any unnecessary uplink transmissions and resuming the transmissions when necessary, should be considered.

Currently in LTE, there are several alternatives:

fined in 3GPP TS 36.321 V12.3.0); and/or Random Access preamble (defined in 3GPP TS 36.321 V12.3.0).

For an implicit stop, a timer, associated with a cell that is maintained by the UE, can be used to decide whether the specific UL transmission should be performed in the cell. In one embodiment, when the timer expires, the UE stops the specific UL transmission in the cell. Alternatively, the UE does not perform the specific UL transmission in the cell if at least the timer is not running. The timer can be started (or restarted) upon the occurrence of one or more of the following conditions: drx-InactivityTimer (defined in 3GPP TS 36.321 V12.3.0) associated with the cell starts; drx-InactivityTimer (defined in 3GPP TS 36.321 V12.3.0) associated with the cell expires; drxShortCycleTimer (defined in 3GPP TS 36.321 V12.3.0) associated with the cell starts; drxShortCycleTimer (defined in 3GPP TS 36.321 V12.3.0) associated with the cell expires; the UE receives a DRX Command MAC Control Element (defined in 3GPP TS 36.321 V12.3.0); the UE receives a downlink transmission in the cell; the UE receives a downlink transmission associated with the cell; the UE receives a uplink grant in the cell; and/or the UE receives a uplink grant associated with the cell.

| Alternative | Analysis |
| --- | --- |
| De-configure the small cell and reconfigure it if necessary as disclosed in 3GPP TS 36.331 V12.3.0 | It results in a lot of signaling overhead and it takes a long time to complete a RRC procedure, i.e. delay is increased. Especially SCG configuration needs to be sent from SeNB to MeNB first and then MeNB forwards the configuration to the UE. |
| De-configure associated RRC configuration, e.g. SRS, Channel State Indicator (CSI) configuration, and reconfigure it if necessary as disclosed in 3GPP TS 36.331 V12.3.0 | It results in a lot of signaling overhead and it takes a long time to complete a RRC procedure, i.e. delay is increased. |
| Deactivate the small cell, i.e. by MAC Control Element or deactivation timer, and activate it if necessary as disclosed in 3GPP TS 36.321 V12.3.0 | Expiry of timeAlignmentTimer only disables UL and deactivation disables both UL and DL. So, upon UL or DL data arrival, transmission is delayed because the cell needs to be activated first. Moreover, PSCell cannot be deactivated. |
| Discontinuous Reception (DRX) as disclosed in 3GPP TS 36.321 V12.3.0 | DRX cannot be used to omit all UL transmissions because SRS and CQI still can be transmitted in some TTI, e.g. during on duration or active time. |
| Reset MAC as disclosed in 3GPP TS 36.321 V12.3.0 and reconfigure associated RRC configuration, e.g. SRS, CSI configuration, if necessary | The MAC entity would be reset to initial state, e.g. all timers are stopped, configuration is released, and all ongoing procedures are stopped, which is overkilled. In addition, resumption of the transmission is also delayed due to RRC procedure. |

As disclosed, none of current existing alternatives is a good replacement of timeAlignmentTimer. Accordingly, there is a need to stop unnecessary uplink transmissions and to resume the transmissions when necessary in a dual frequency band system.

To stop and resume some specific UL transmission in a serving cell could be done either explicitly by a signaling, e.g. Physical Downlink Control Channel (PDCCH) signaling or a Medium Access Control (MAC) control element, from a base station or implicitly by the UE. The specific UL transmission includes at least one of the following signaling: a periodic reference signal, e.g. SRS (defined in 3GPP TS 36.321 V12.3.0); a periodic channel status report. e.g. CQI report (defined in 3GPP TS 36.321 V12.3.0); and/or semi-persistent uplink transmission, e.g. using configured uplink grant (defined in 3GPP TS 36.321 V12.3.0).

More specifically, when the UE stops the specific UL transmission, (RRC) configuration associated with the specific UL transmission is not released. And the UE does not stop at least one of the following signaling when the specific UL transmission has been stopped: Scheduling request (de- Alternatively, this timer could be a drx-InactivityTimer or a drxShortCycleTimer.

For implicit resumption, the UE can resume the specific UL transmission upon at least one of the following conditions occurs: the UE receives a downlink transmission in the cell; the UE receives a downlink transmission associated with the cell; the UE receives a uplink grant in the cell; the UE receives a uplink grant associated with the cell; the UE triggers Scheduling Request (defined in 3GPP TS 36.321 V12.3.0); and/or the UE detects that a beam set of the cell for the UE is changed.

Regarding explicit resumption, if the serving cell in capacity layer uses beam forming, a first base station (e.g., SeNB) controlling the serving cell (e.g., SCell or PSCell) may not be able to identify the direction to reach the UE after a period time without UL transmission from the UE. As a result, the first base station does not know which beam to transmit a signaling to ask the UE to resume the specific UL transmission. So, the explicit resumption needs assistance from a second base station such as, for example, the MeNB which controls another serving cell in coverage layer. The second base station may transmit a DL signaling, such as PDCCH signaling or a MAC control element, to ask the UE to do at least one of the following actions: resume the specific UL transmission in the serving cell; initiate a Random Access procedure in the serving cell; transmit a Scheduling Request in the serving cell; and/or transmit an aperiodic reference signal, e.g. aperiodic SRS, in the serving cell. More specifically, the serving cell can schedule transmissions in the serving cell, e.g. PDCCH signaling can be transmitted in the serving cell.

More specifically, the DL signaling may indicate a dedicated preamble to be used in the Random Access procedure. The DL signaling can be a PDCCH order (defined in 3GPP TS 36.321 V12.3.0). More specifically, the second base station transmits the DL signaling due to reception of a request from the first base station.

Figure 5:
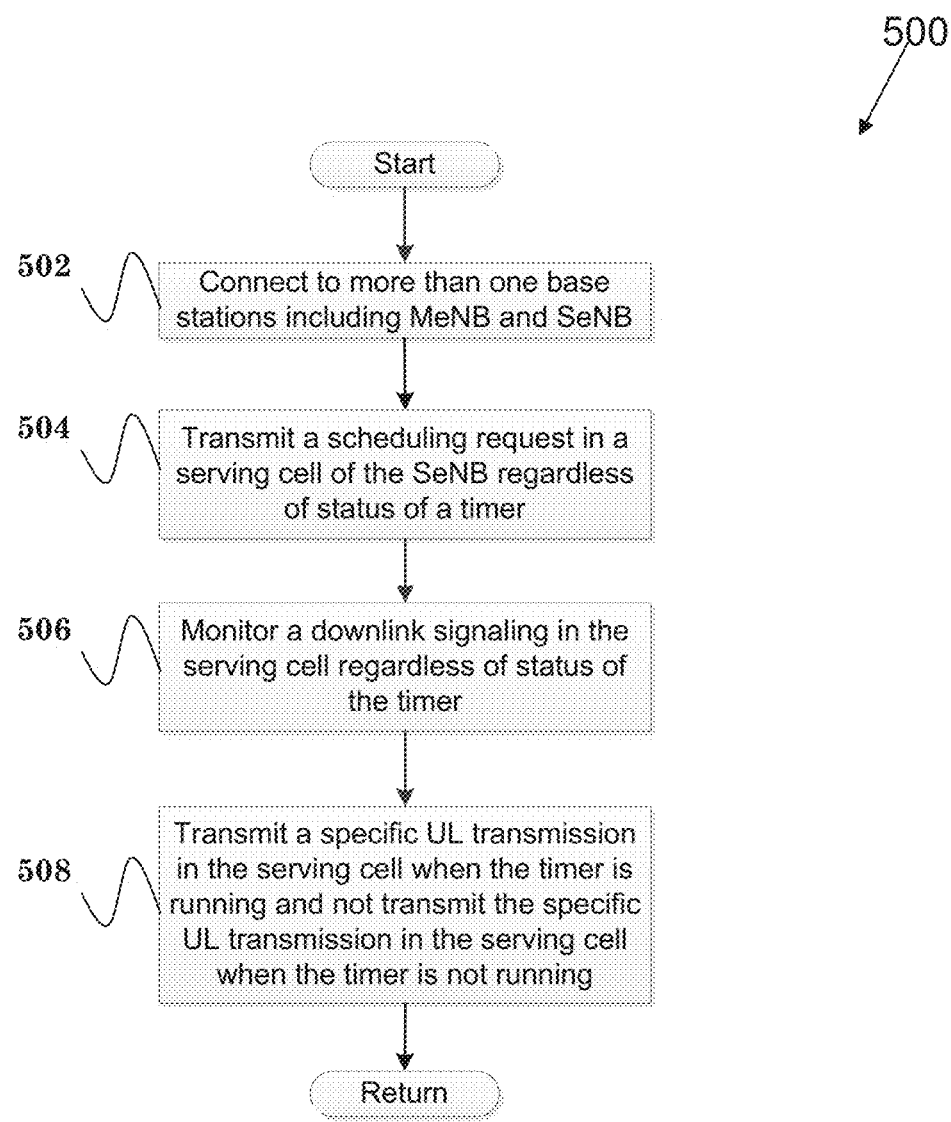
FIG. 5 is a flow diagram according to one exemplary embodiment.

FIG. 5 illustrates a flow diagram 500 from the perspective of a UE in accordance with one exemplary embodiment. In step 502, the UE connects to more than one base station that include the MeNB and SeNB. In Step 504, a scheduling request is transmitted in a serving cell of the SeNB regardless of the status of a timer. In Step 506, a downlink signaling is monitored in the serving cell regardless of the status of the timer. In Step 508, a specific UL transmission is transmitted in the serving cell when the timer is running, and the specific UL transmission is not transmitted in the serving cell when the timer is not running.

Figure 6:
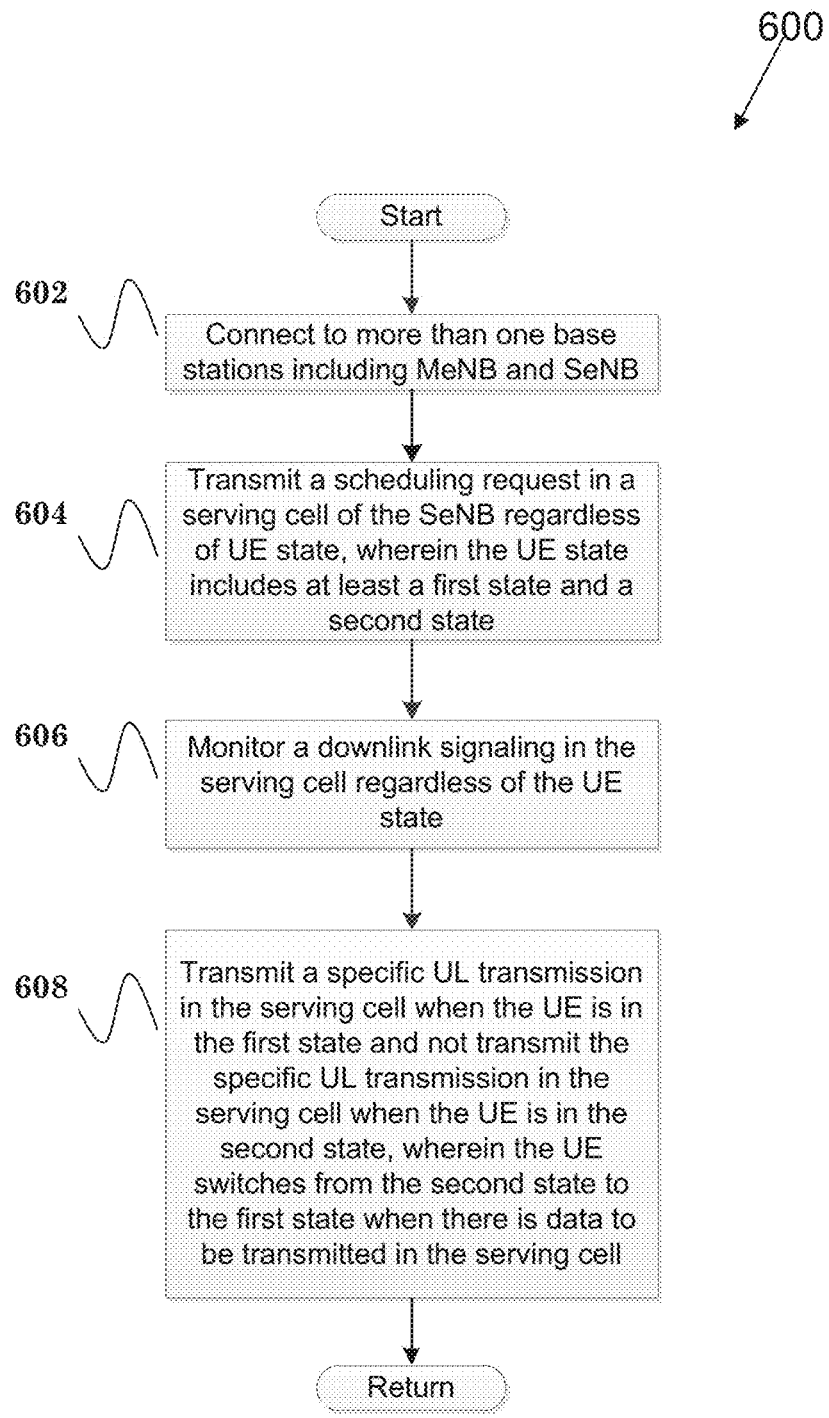
FIG. 6 is a flow diagram according to one exemplary embodiment.

FIG. 6 illustrates a flow diagram 600 from the perspective of a UE in accordance with one exemplary embodiment. In step 602, the UE connects to more than one base station that includes the MeNB and SeNB. In step 604, a scheduling request is transmitted in a serving cell of the SeNB regardless of the UE state, wherein the UE state includes at least a first state and a second state. In step 606, a downlink signaling is monitored in the serving cell regardless of the UE state. In step 608, a specific UL transmission is transmitted in the serving cell when the UE is in the first state, and the specific UL transmission is not transmitted in the serving cell when the UE is in the second state, wherein the UE switches from the second state to the first state when the UE has data to be transmitted in the serving cell.

Figure 7:
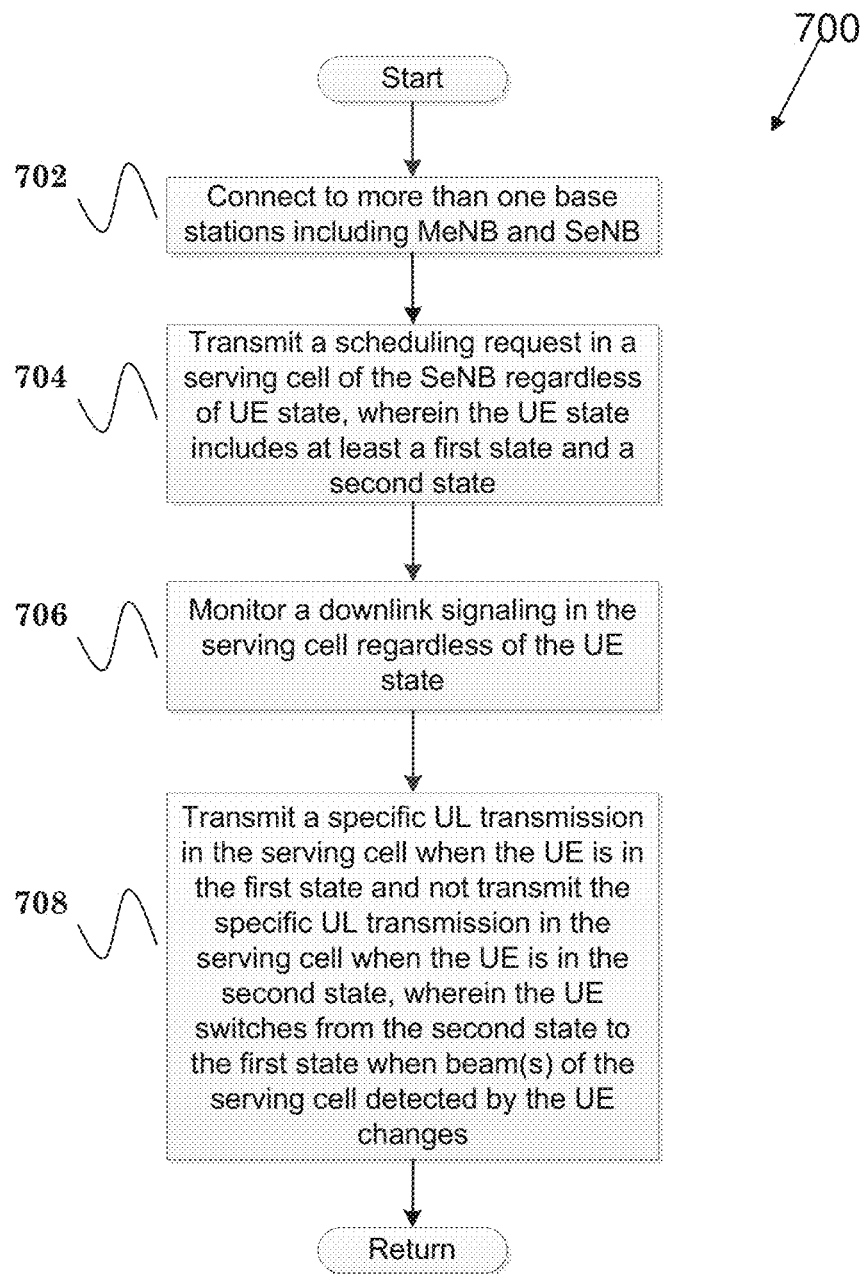
FIG. 7 is a flow diagram according to another exemplary embodiment.

FIG. 7 illustrates a flow diagram 700 from the perspective of a UE in accordance with one exemplary embodiment. In step 702, the UE connects to more than one base station that include the MeNB and SeNB. In step 704, a scheduling request is transmitted in a serving cell of the SeNB regardless of the UE state, wherein the UE state includes at least a first state and a second state. In step 706, a downlink signaling is monitored in the serving cell regardless of the UE state. In step 708, a specific UL transmission is transmitted in the serving cell when the UE is in the first state, and the specific UL transmission is not transmitted in the serving cell when the UE is in the second state, wherein the UE switches from the second state to the first state when the one or more beams of the serving cell detected by the UE changes.

Figure 8:
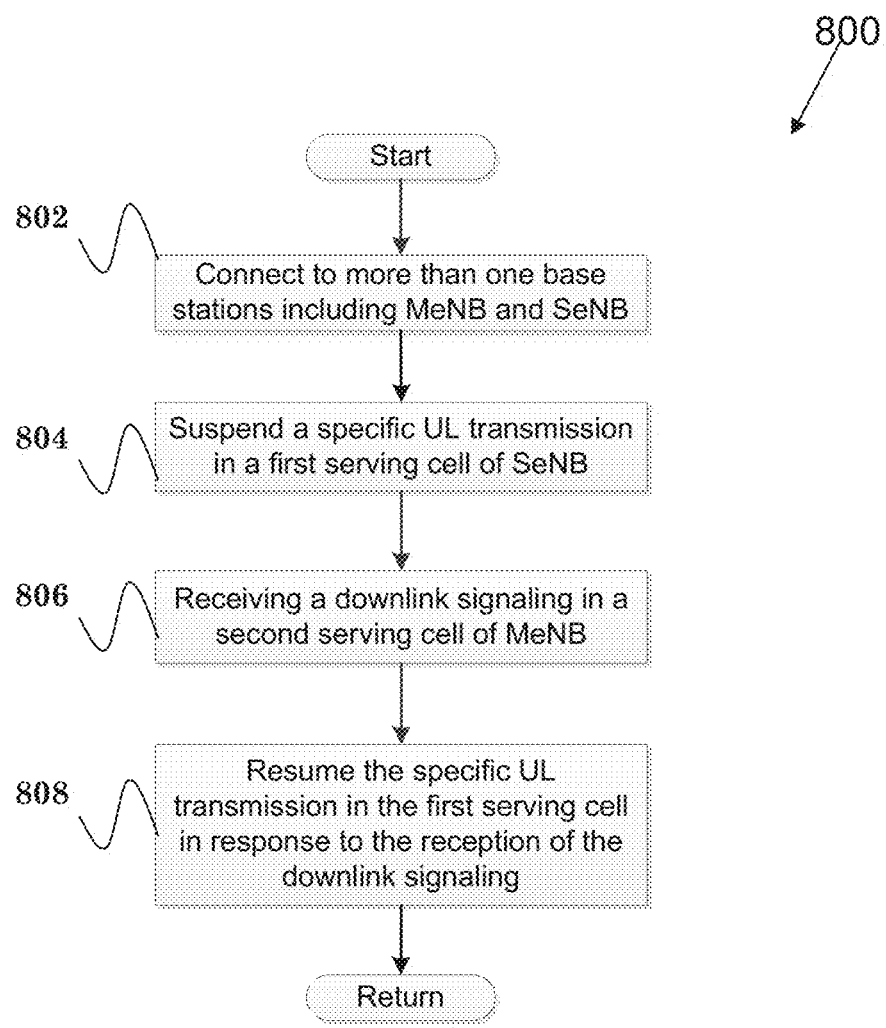
FIG. 8 is a flow diagram according to yet another exemplary embodiment.

FIG. 8 illustrates a flow diagram 800 from the perspective of a UE in accordance with one exemplary embodiment. In step 802, the UE connects to more than one base station that include the MeNB and SeNB. In step 804, a specific UL transmission is suspended in a first serving cell of SeNB. In step 806, a downlink signaling is received in a second serving cell of MeNB. In step 808, the specific UL transmission resumes in the first serving cell in response to the reception of the downlink signaling.

According to one exemplary method in which a UE is served by a serving cell, at least one specific uplink transmission is suspended in the serving cell if a timer is not running. A scheduling request is transmitted in the serving cell no matter whether or not the timer is running, wherein the timer does not affect timing of monitoring downlink signaling in the serving cell.

In another exemplary method in which a UE is served by a serving cell, at least one specific uplink transmission is suspended in the serving cell due to the expiry of a timer. A scheduling request is transmitted in the serving cell no matter whether or not the timer is or is not expired, wherein the timer does not affect timing of monitoring downlink signaling in the serving cell.

In another embodiment of these exemplary methods, the UE transmits the specific uplink transmission in the serving cell when the timer is running.

In these exemplary methods, the timer is associated with the serving cell, but, the timer is not necessarily associated with all serving cells the UE is connected to.

In these exemplary methods, the timer is started when a DRX timer associated with the serving cell starts. In other exemplary methods, the timer is re-started when a DRX timer associated with the serving cell expires. The DRX timer may be drx-InactivityTimer or drxShortCycleTimer.

In another method, the timer is started when the downlink signaling is received in the serving cell. In yet another method, the timer is re-started when the downlink signaling associated with the serving cell is received.

In another method, the timer is started when a DRX Command MAC Control Element is received in the serving cell. In yet another method, the timer is re-started when a DRX Command MAC Control Element is received in the serving cell.

In one exemplary method in which a UE is served by a serving cell, the UE enters into a first state. In this first state, the UE is allowed to perform at least a specific uplink transmission and a scheduling request in the serving cell. When the UE changes to a second state, the UE is allowed to at least perform the scheduling request and the UE suspends the specific uplink transmission in the serving cell. The UE switches from the second state to the first state when an event occurs. The UE monitors the downlink signaling in the serving cell no matter whether the UE is in the first state or the second state.

In one method, the UE changes from the first state to the second state when a timer expires. Alternatively, the UE changes from the first state to the second state when a command from a network is received. In some embodiments, the event that triggers the UE switching from the second state to the first state includes receiving the downlink signaling in the serving cell; receiving the downlink signaling associated with the serving cell; triggering the scheduling request; detecting that a beam set for the UE in the serving cell is changed; and/or one or more beam(s) of the serving cell detected by the UE changes.

In other methods, the detection of the beam is a power of a DL reference signal associated with the beam, received by the UE, is larger than a threshold. In other methods, the transmission timing of a DL reference signal associated with a beam can be used by the UE to identify or detect the beam, i.e., derive an identification of the beam. Alternatively, the transmission resource of a DL reference signal associated with the beam can be used by the UE to identify or detect the beam, i.e., derive an identification of the beam.

In other methods, determining whether the UE is in the first state or the second state is based on whether a timer is running or not.

In other methods, the UE needs to periodically perform the specific uplink transmission in the first state. The UE does not need to periodically perform the specific uplink transmission in the second state.

In another exemplary method for a UE, the method includes connecting to at least two base stations including a first base station controlling a serving cell and a second base station controlling another serving cell: suspending a specific uplink transmission in the serving cell; receiving a downlink signaling in the another serving cell; and resuming the specific uplink transmission in the serving cell in response to the reception of the downlink signaling.

In one exemplary method for a first base station, the method includes serving a UE; and transmitting a request to a second base station, wherein the request asks the second base station to transmit a downlink signaling to the UE to indicate the UE to resume a specific uplink transmission in a serving cell controlled by the first base station.

In one exemplary method for a second base station, the method includes serving a UE; receiving a request from a first base station, wherein the request asks the second base station to transmit a downlink signaling to the UE; and transmitting the downlink signaling to the UE to indicate the UE to resume a specific uplink transmission in a serving cell controlled by the first base station.

In other methods for the UE, the first base station, and the second base station, the downlink signaling indicates the UE to resume the specific uplink transmission in the serving cell. Additionally, in other methods, the UE is allowed to transmit a scheduling request in the serving cell when the specific uplink transmission in the serving cell is suspended.

In another exemplary method, a UE connects to at least two base stations including a first base station controlling a serving cell and a second base station controlling another serving cell; receives a downlink signaling in the another serving cell; and transmits a reference signal in the serving cell in response to the reception of the downlink signaling.

In another exemplary method, a first base station serves a UE; and transmits a request to a second base station, wherein the request asks the second base station to transmit a downlink signaling to the UE to indicate the UE to transmit a reference signal in a serving cell controlled by the first base station.

In another exemplary method, a second base station serves a UE; receives a request from a first base station, wherein the request asks the second base station to transmit a downlink signaling to the UE; and transmits the downlink signaling to the UE to indicate the UE to transmit a reference signal in a serving cell controlled by the first base station.

In other methods for the UE, the first base station, and the second base station, the downlink signaling indicates the UE to transmit the reference signal in the serving cell. Additionally, in other methods, the reference signal is an aperiodic reference signal. In some methods, the UE suspends a specific uplink transmission in the serving cell when receiving the downlink signaling. In other methods, the UE resumes the specific uplink transmission in the serving cell in response to the reception of the downlink signaling.

In various methods, the first base station is SeNB and the second base station is MeNB. In some methods, the serving cell is PSCell. Alternatively, the serving cell is SCell. In the various methods disclosed herein, the base station is an eNB.

In the various exemplary methods, the UE keeps (RRC) configuration of the specific uplink transmission when suspending the specific uplink transmission. In other methods, transmission in the serving cell can by scheduled by the serving cell, e.g. PDCCH signaling can be transmitted in the serving cell.

In various methods disclosed herein, the UE connects to a plurality of serving cells. In some embodiments, the plurality of serving cells is controlled by more than base stations. Alternatively, the plurality of serving cells is controlled by different base stations. In some methods, the serving cell is controlled by a base station, e.g. SeNB, which does not control PCell.

In various methods disclosed herein, the specific uplink transmission is transmitted periodically, e.g. based on configuration received from the network. In the various methods disclosed herein, the specific uplink transmission may include a reference signal; a SRS; CQI reporting; Precoding Matrix Index (PMI) reporting (as defined in 3GPP TS 36.321 V12.3.0); Rank Indicator (RI) reporting (as defined in 3GPP TS 36.321 V12.3.0); Precoding Type Indicator (PTI) reporting (as defined in 3GPP TS 36.321 V12.3.0); and/or a semi-persistent uplink transmission, (e.g. UL Semi-Persistent Scheduling (SPS)); In the various methods disclosed herein, the specific uplink transmission does not include Random Access preamble.

In various methods disclosed herein, the scheduling request is transmitted due to Buffer Status Report (BSR) triggering (as defined in 3GPP TS 36.321 V12.3.0). In other methods, the scheduling request is used to request uplink resource.

In various methods disclosed herein, the downlink signaling indicates a downlink assignment in the serving cell or an uplink grant in the serving cell. Alternatively, the downlink signaling is used for a new transmission. In other methods, the uplink grant is for a new transmission.

In various methods, the downlink signaling is transmitted via PDCCH or via Physical Downlink Shared Channel (PDSCH). In other methods, the downlink signaling is a downlink assignment or a MAC Control Element.

As discussed above, a cell using a higher frequency band would have coverage limitation. A UE in the cell may be always uplink time aligned due to small coverage or current mechanisms still maintained that uplink time for UE may be considered not aligned for some scenarios (as discussed in 3GPP TS 36.321 V12.3.0), e.g. timeAlignmentTimer expiry. In other words. UL Timing Advance may be still required for the UE, and timeAlignmentTimer (as defined in 3GPP TS 36.321 V12.3.0) associated with the cell may or may not be required for the UE.

Nevertheless, some specific UL transmission in a serving cell of the capacity layer may need to be stopped for UE power saving and later resumed, e.g. for DL data arrival and transmitted in the serving cell. The specific UL transmission includes at least one of the following signaling: a periodic reference signal, e.g. periodic SRS (as defined in 3GPP TS 36.321 V12.3.0); a periodic channel status report, e.g. CQI report (as defined in 3GPP TS 36.321 V12.3.0); and/or semi-persistent uplink transmission, e.g. using configured uplink grant (as defined in 3GPP TS 36.321 V12.3.0).

Stopping the specific UL transmission could be done either explicitly by a signaling, e.g. PDCCH signaling or a MAC control element, from the base station or implicitly by the UE, e.g. controlled by a timer. More specifically, when the UE stops the specific UL transmission. RRC configuration associated with the specific UL transmission is not released.

For resumption, a first base station, e.g. SeNB, controlling the serving cell could ask a second base station, e.g. MeNB, controlling another serving cell in coverage layer to transmit a DL signaling, e.g. PDCCH signaling or a MAC control element, to ask the UE to do at least one of the following actions: resume the specific UL transmission in the serving cell; initiate Random Access Preamble transmission(s) (as defined in 3GPP TS 36.321 V12.3.0) in the serving cell, e.g. initiate a Random Access procedure; transmit a Scheduling Request (as defined in 3GPP TS 36.321 V12.3.0) in the serving cell; and/or transmit an aperiodic reference signal, e.g. aperiodic SRS (as defined in 3GPP TS 36.321 V12.3.0), in the serving cell.

More specifically, the DL signaling may indicate a dedicated preamble to be used in the Random Access procedure. The DL signaling can be a PDCCH order (as defined in 3GPP TS 36.331 V12.3.0). More specifically, the second base station transmits the DL signaling due to reception of a request from the first base station. Examples are shown in FIGS. 9 and 10.

Figure 9:
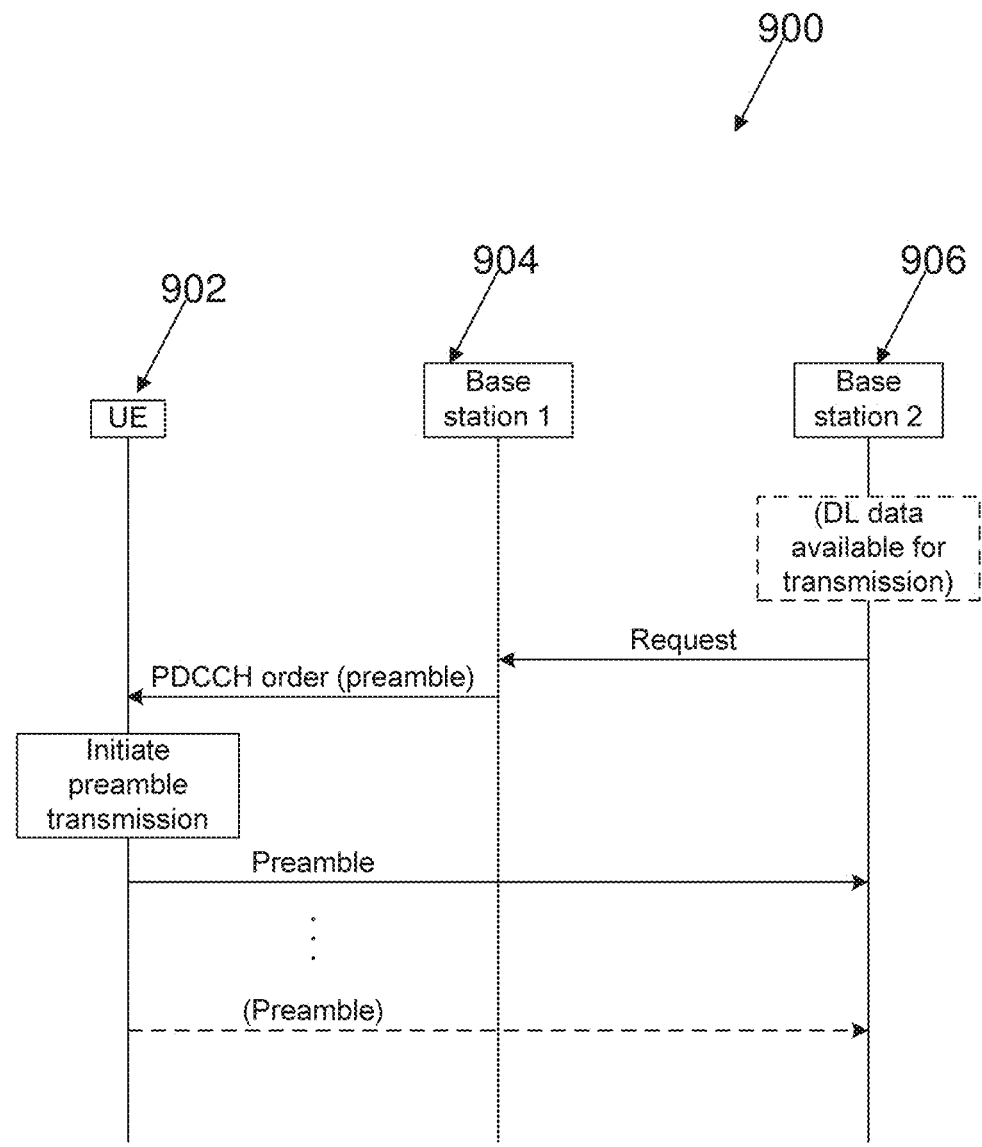
FIG. 9 is a diagram illustrating signaling flow according to one exemplary embodiment.

In FIG. 9, a base station 2 906 has DL data available for transmission. A request is sent by the base station 2 906 to a base station 1 904. The base station 1 904 sends a PDCCH order to a UE 902. The UE 902 then initiates a preamble transmission and sends one or more preamble transmission to the base station 2 906.

Figure 10:
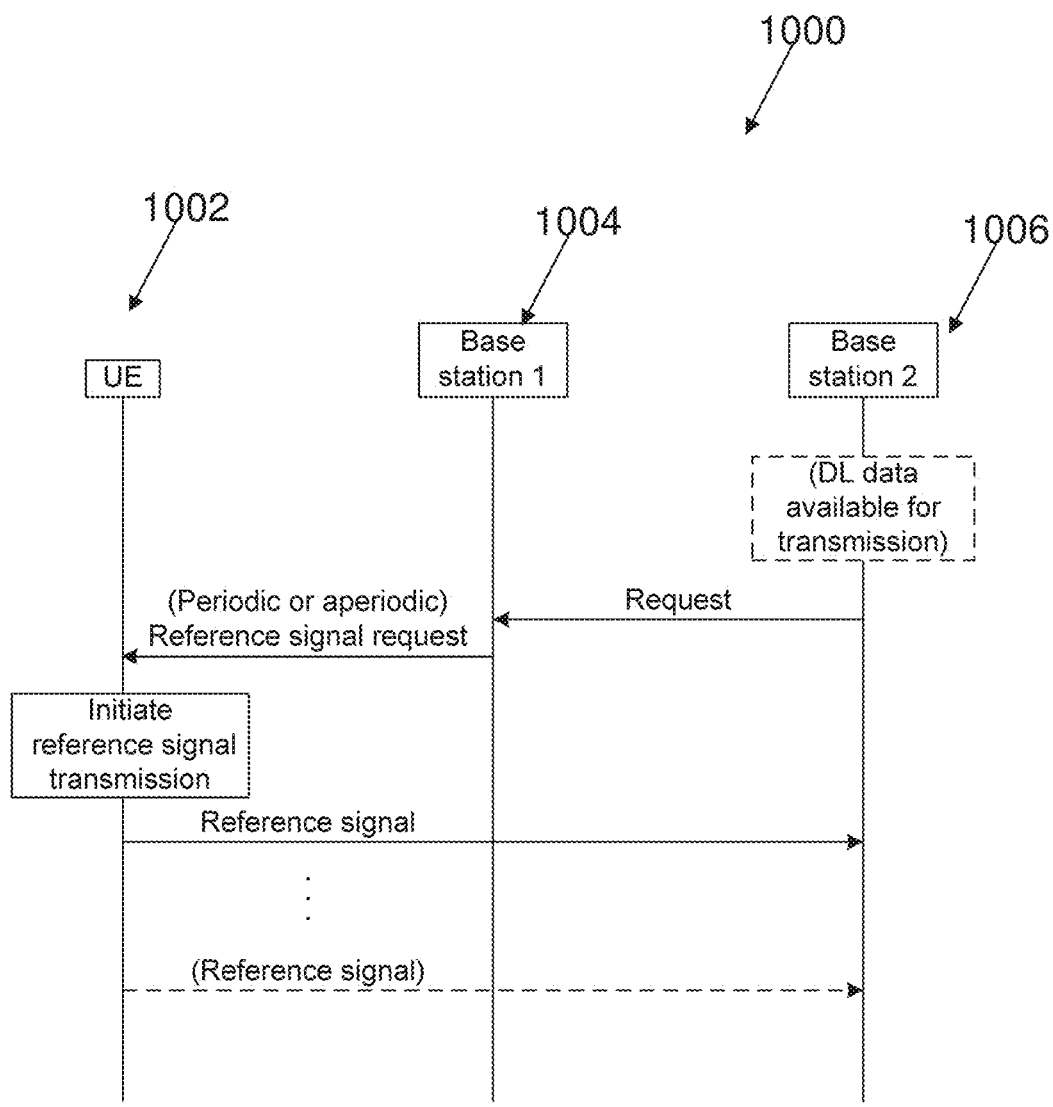
FIG. 10 is a diagram illustrating signaling flow according to one exemplary embodiment.

In FIG. 10, a base station 2 1006 has DL data available for transmission. A request is sent by the base station 2 1006 to a base station 1 1004. The base station 1 1004 sends a periodic or aperiodic reference signal request to a UE 1002. The UE 1002 then initiates a reference signal transmission and sends one or more reference signals to the base station 2 1006.

Figure 11:
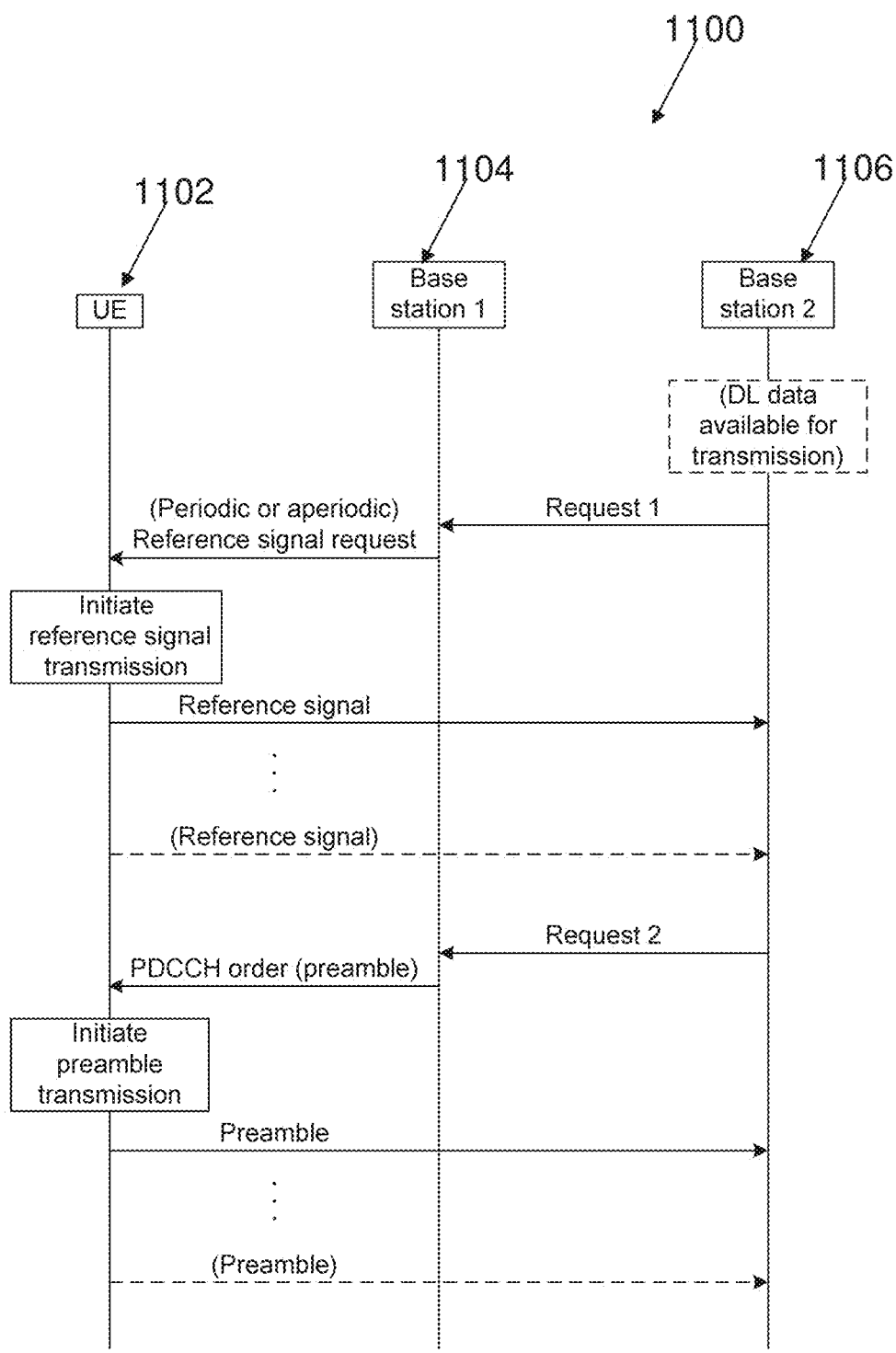
FIG. 11 is diagram illustrating signaling flow according to one exemplary embodiment.

Alternatively, the first base station could transmit more than one request to ask a second base station to transmit more than one DL signaling and each of the DL signaling is used to ask the UE to do at least one of above actions. An example is shown in FIG. 11. A base station 2 1106 could firstly ask a UE 1102 via a base station 1 1104 to transmit reference signal in the serving cell. So, the base station 2 1106 could identify beam(s) where the UE 1102 is located. Then, the base station 2 1106 could ask the UE 1102 via the base station 1 1104 to perform Random Access Preamble transmission(s) to identify UL Timing Advance (as defined in 3GPP TS 36.321 V12.3.0) for the UE 1102.

In one exemplary method for a UE, the method includes connecting the UE to at least two base stations including a first base station controlling a serving cell and a second base station controlling another serving cell; receiving a second downlink signaling in the another serving cell after stopping transmission(s) of a first specific uplink signal in the serving cell; and transmitting at least one Random Access Preamble in the serving cell in response to the reception of the second downlink signaling.

In another exemplary method, the UE transmits at least one second specific uplink signal in the serving cell in response to the reception of the second downlink signaling.

In one exemplary method for a UE, the method includes connecting to at least two base stations including a first base station controlling a serving cell and a second base station controlling another serving cell: receiving a first downlink signaling in the another serving cell after stopping transmission(s) of a first specific uplink signal in the serving cell; transmitting at least one second specific uplink signal in the serving cell in response to the reception of the first downlink signaling; receiving a second downlink signaling in the another serving cell after transmitting the at least one second specific uplink signal; and transmitting at least one Random Access Preamble in the serving cell in response to the reception of the second downlink signaling.

In other exemplary methods, the UE stops transmission(s) of the first specific uplink signal due to expiry of a timer, such as timeAlignmentTimer. In another method, the UE stops transmission(s) of the first specific uplink signal due to reception of an indication from the first base station. In yet another method, the UE stops transmission(s) of the first specific uplink signal due to reception of an indication from the second base station.

In other exemplary methods, the UE initiates a Random Access procedure in the serving cell in response to the reception of the second downlink signaling. In other methods, the timer, e.g. timeAlignmentTimer, is not running when the UE transmits at least one second specific uplink signal in the serving cell in response to the reception of the first downlink signaling.

In another exemplary method for a first base station serving a UE, the method includes transmitting a second request to a second base station, wherein the second request asks the second base station to transmit a second downlink signaling to the UE to indicate the UE to transmit at least one Random Access Preamble in a serving cell controlled by the first base station. In another method, the second downlink signaling also indicates the UE to transmit at least one second specific uplink signal in the serving cell.

In another exemplary method for a first base station serving a UE, the method includes transmitting a first request to a second base station, wherein the first request asks the second base station to transmit a first downlink signaling to the UE to indicate the UE to transmit at least one second specific uplink signal in a serving cell controlled by the first base station; receiving the at least one second specific uplink signal; and transmitting a second request to the second base station in response to reception of the at least one second specific uplink signal from the UE, wherein the second request asks the second base station to transmit a second downlink signaling to the UE to indicate the UE to transmit at least one Random Access Preamble in the serving cell.

In other methods, the first base station determines beam(s) of the serving cell where the UE is located based on at least the reception of the Random Access Preamble. In other methods, the first base station determines beam(s) of the serving cell where the UE is located based on at least the reception of the second specific uplink signal.

In other methods, the first base station transmits the first request to the second base station based on at least there is data to be transmitted to the UE in the serving cell. In another method, the first base station transmits the second request to the second base station based on at least there is data to be transmitted to the UE in the serving cell.

In an exemplary method for a second base station serving a UE, the method includes receiving a second request from a first base station, wherein the second request asks the second base station to transmit a second downlink signaling to the UE; and transmitting the second downlink signaling to the UE, in response to the reception of the second request, to indicate the UE to transmit at least one Random Access Preamble in a serving cell controlled by the first base station.

In another method, the second downlink signaling also indicates the UE to transmit at least one second specific uplink signal in the serving cell.

In an exemplary method for a second base station serving a UE, the method includes receiving a first request from a first base station, wherein the first request asks the second base station to transmit a first downlink signaling to the UE; transmitting the first downlink signaling to the UE, in response to the reception of the first request, to indicate the UE to transmit at least one second specific uplink signal in a serving cell controlled by the first base station; receiving a second request from the first base station after transmitting the first downlink signaling to the UE, wherein the second request asks the second base station to transmit a second downlink signaling to the UE; and transmitting the second downlink signaling to the UE, in response to the reception of the second request, to indicate the UE to transmit at least one Random Access Preamble in the serving cell.

In the various exemplary methods, the second downlink signaling indicates the UE to initiate a Random Access procedure in the serving cell. In other exemplary methods, the UE keeps (RRC) configuration of the first specific uplink signal when stopping transmission(s) of the first specific uplink signal.

In the various exemplary methods, the first specific uplink signal is transmitted periodically, e.g. based on configuration received from the network.

In the various exemplary methods, the first specific uplink signal is a reference signal. SRS, CQI reporting, PMI reporting, RI reporting, PTI reporting, or semi-persistent uplink transmission.

In the various exemplary methods, the second specific uplink signal is the first specific uplink transmission, aperiodic reference signal, or Scheduling Request.

In the various exemplary methods, the first downlink signaling is a PDCCH signaling, MAC Control Element, or RRC message.

In the various exemplary methods, the second downlink signaling is a PDCCH signaling, PDCCH order, MAC Control Element, or RRC message.

In the various exemplary methods, the first base station is an eNB or SeNB. In the various exemplary methods, the second base station is a MeNB. In the various exemplary methods, the serving cell is a PSCell or SCell. In the various exemplary methods, another serving cell is a PCell.

Referring back to FIGS. 3 and 4, in one embodiment from the perspective of a device, the device 300 includes a program code 312 stored in memory 310. The CPU 308 could execute program code 312 (i) to connect a user equipment, to at least two base stations including a first base station controlling a first serving cell and a second base station controlling a second serving cell, (ii) to receive a downlink signaling in the second serving cell, and (iii) to transmit a reference signal in the first serving cell in response to the reception of the downlink signaling. In addition, the CPU 308 can execute the program code 312 to perform all of the above-described actions and steps or others described herein.

Referring back to FIGS. 3 and 4, in one embodiment from the perspective of a first base station, the first base station 300 includes a program code 312 stored in memory 310. The CPU 308 could execute program code 312 (i) to serve a UE, and (ii) to transmit a request to a second base station, wherein the request asks the second base station to transmit a downlink signaling to the UE to indicate the UE to transmit a reference signal in a serving cell controlled by the first base station. In addition, the CPU 308 can execute the program code 312 to perform all of the above-described actions and steps or others described herein.

Referring back to FIGS. 3 and 4, in one embodiment from the perspective of a second base station, the second base station 300 includes a program code 312 stored in memory 310. The CPU 308 could execute program code 312 (i) to serve a UE, (ii) to receive a request from a first base station, wherein the request asks the second base station to transmit a downlink signaling to the UE, and (iii) to transmit the downlink signaling to the UE to indicate the UE to transmit a reference signal in a serving cell controlled by the first base station. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory. EPROM memory. EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for handling an uplink transmission in a wireless communication system, the method comprising:
   connecting a User Equipment (UE) to at least two access points including a first access point controlling a first serving cell and a second access point controlling a second serving cell;
   transmitting, by the UE, a specific uplink transmission periodically using a configured uplink grant in the first serving cell;
   suspending, by the UE, the specific uplink transmission in the first serving cell when receiving a second downlink signaling to suspend the specific uplink transmission, wherein the UE keeps a configuration of the specific uplink transmission when suspending the specific uplink transmission;
   receiving, by the UE, a first downlink signaling in the second serving cell, wherein the first downlink signaling indicating a downlink assignment in the first serving cell; and
   transmitting, by the UE, a reference signal in the first serving cell and resuming, by the UE, the specific uplink transmission using the configured uplink grant in the first serving cell in response to the reception of the first downlink signaling.

2. The method of claim 1, further comprising:
   transmitting periodically, by the UE, a Sounding Reference Signal (SRS), a Channel Quality Indicator (CQI) reporting, a Precoding Matrix Index (PMI) reporting, and a Rank Indicator (RI) reporting, in addition to the specific uplink transmission, in the first serving cell.

3. The method of claim 1, wherein the specific uplink transmission is a semi-persistent uplink transmission.

4. The method of claim 1, wherein the reference signal is an aperiodic reference signal or a periodic reference signal.

5. The method of claim 1, wherein the reference signal is for beam determination.

6. The method of claim 1, wherein the first downlink signaling is transmitted via Physical Downlink Control Channel (PDCCH) or a Medium Access Control (MAC) Control Element.

7. The method of claim 1, wherein the first downlink signaling indicates the UE to transmit the reference signal in the first serving cell.

8. The method of claim 2, further comprising:
   suspending, by the UE, the SRS, the CQI reporting, the PMI reporting, and the RI reporting in the first serving when receiving the second downlink signaling; and
   resuming, by the UE, the SRS, the CQI reporting, the PMI reporting, and the RI reporting in response to the reception of the first downlink signaling.

9. The method of claim 1, wherein the second downlink signaling is transmitted via PDCCH or a MAC Control Element.

10. The method of claim 1, wherein the specific uplink transmission is suspended when a timer expires.

11. A communication device for handling an uplink transmission in a wireless communication system, the communication device comprising:
    a control circuit;
    a processor installed in the control circuit; and
    a memory installed in the control circuit and operatively coupled to the processor;
    wherein the processor is configured to execute a program code stored in the memory for handling uplink transmission by:
       connecting the communication device to at least two access points including a first access point controlling a first serving cell and a second access point controlling a second serving cell;
       transmitting, by the communication device, a specific uplink transmission periodically using a configured uplink grant in the first serving cell;
       suspending, by the communication device, the specific uplink transmission in the first serving cell when receiving a second downlink signaling to suspend the specific uplink transmission, wherein the communication device keeps a configuration of the specific uplink transmission when suspending the specific uplink transmission;

receiving, by the communication device, a first downlink signaling in the second serving cell, wherein the first downlink signaling indicating a downlink assignment in the first serving cell; and transmitting, by the communication device, a reference signal in the first serving cell and resuming, by the communication device, the specific uplink transmission using the configured uplink grant in the first serving cell in response to the reception of the first downlink signaling.

12. The communication device of claim 11, further comprising:

transmitting periodically, by the communication device, a Sounding Reference Signal (SRS), a Channel Quality Indicator (CQI) reporting, a Precoding Matrix Index (PMI) reporting, and a Rank Indicator (RI) reporting, in addition to the specific uplink transmission, in the first serving cell.

13. The communication device of claim 11, wherein the specific uplink transmission is a semi-persistent uplink transmission.

14. The communication device of claim 11, wherein the reference signal is an aperiodic reference signal or a periodic reference signal.

15. The communication device of claim 11, wherein the reference signal is for beam determination.

16. The communication device of claim 11, wherein the first down link signaling is transmitted via Physical Downlink Control Channel (PDCCH) or a Medium Access Control (MAC) Control Element.

17. The communication device of claim 11, wherein the first downlink signaling indicates the communication device to transmit the reference signal in the first serving cell.

18. The communication device of claim 11 executing the program code, the program code further comprising:

suspending, by the communication device, the SRS, the CQI reporting, the PMI reporting, and the RI reporting in the first serving when receiving the second downlink signaling; and resuming, by the communication device, the SRS, the CQI reporting, the PMI reporting, and the RI reporting in response to the reception of the first downlink signaling.

19. The communication device of claim 11, wherein the second downlink signaling is transmitted via PDCCH or a MAC Control Element.

20. The communication device of claim 11, wherein the specific uplink transmission is suspended when a timer expires.

* * * * *